(12) United States Patent
Onishi

(10) Patent No.: US 9,873,457 B2
(45) Date of Patent: Jan. 23, 2018

(54) VEHICLE SKELETON STRUCTURE

(71) Applicant: Toyota Jidosha Kabushiki Kaisha, Toyota-shi (JP)

(72) Inventor: Yoichiro Onishi, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/078,118

(22) Filed: Mar. 23, 2016

(65) Prior Publication Data

US 2017/0015360 A1    Jan. 19, 2017

(30) Foreign Application Priority Data

Jul. 17, 2015 (JP) ................................. 2015-143244

(51) Int. Cl.
*B62D 21/15* (2006.01)
*B62D 27/02* (2006.01)
*B62D 25/20* (2006.01)

(52) U.S. Cl.
CPC ........... *B62D 21/157* (2013.01); *B62D 21/15* (2013.01); *B62D 25/2036* (2013.01); *B62D 27/023* (2013.01)

(58) Field of Classification Search
CPC ...... B62D 21/15; B62D 21/157; B62D 25/20; B62D 25/2009; B62D 25/2036; B62D 27/023

(Continued)

(56) References Cited

U.S. PATENT DOCUMENTS 7,434,871 B2 * 10/2008 Mizuma ................. B60N 2/015
296/193.07
7,600,807 B2 * 10/2009 Bachmann ........... B62D 21/157
296/187.08

(Continued)

FOREIGN PATENT DOCUMENTS

| JP | 61-44371 U | 3/1986 |
| JP | 2012-166710 | 9/2012 |
| JP | 2015-105033 | 6/2015 |

OTHER PUBLICATIONS

Office Action dated Aug. 15, 2017 in Japanese Patent Application No. 2015-143244 (with English translation).

(Continued)

*Primary Examiner* — Jason S Daniels
(74) *Attorney, Agent, or Firm* — Oblon, McClelland, Maier & Neustadt, L.L.P.

(57) ABSTRACT

A vehicle skeleton structure including: a tunnel portion that projects upward in a vertical direction at a vehicle width direction central portion of a floor panel, and that extends in a vehicle front-rear direction, the tunnel portion including side wall portions opposing each other in the vehicle width direction, and an upper wall portion that interconnects upper end portions of the side wall portions; a tunnel upper reinforcement member that covers the upper wall portion and the side wall portions of the tunnel portion from an exterior of each and that is joined to the tunnel portion; and a cross member that bridges, along the vehicle width direction, the tunnel portion and a rocker that is disposed at a vehicle width direction outer side of the floor panel, and that extends in the vehicle front-rear direction, the cross member being directly or indirectly joined to the tunnel upper reinforcement member.

5 Claims, 6 Drawing Sheets

(58) Field of Classification Search
USPC .............. 296/29, 30, 187.12, 193.02, 193.07
See application file for complete search history.

(56) References Cited

U.S. PATENT DOCUMENTS

| | | | | |
|---|---|---|---|---|
| 7,644,978 | B2* | 1/2010 | Tosaka ................. | B62D 21/157 |
| | | | | 296/187.08 |
| 8,567,857 | B2* | 10/2013 | Fujii ..................... | B60R 22/023 |
| | | | | 296/193.05 |
| 2011/0210582 | A1* | 9/2011 | Mori .................... | B62D 21/157 |
| | | | | 296/193.07 |
| 2012/0019026 | A1* | 1/2012 | Deng ................... | B60N 2/4235 |
| | | | | 296/193.02 |

OTHER PUBLICATIONS

Japanese Office Action dated Nov. 7, 2017 in Japanese Application No. 2015-143244 (2 pages).

* cited by examiner

VEHICLE SKELETON STRUCTURE

CROSS-REFERENCE TO RELATED APPLICATION

This application is based on and claims priority under 35 USC 119 from Japanese Patent Application No. 2015-143244 filed on Jul. 17, 2015, the disclosure of which is incorporated by reference herein.

BACKGROUND

Technical Field

The present disclosure relates to a vehicle skeleton structure for an automobile.

Related Art

A technology is known in which front cross members (cross members) bridge a floor tunnel portion (tunnel portion) of a floor panel and rockers and in which a console box is disposed on the upper side of the floor tunnel portion on the vehicle rear side of the front cross members (e.g., see Japanese Patent Application Laid-open (JP-A) No. 2012-166710).

Moreover, in the above document a technology is described in which a stiffener (a tunnel upper reinforcement member) is disposed between the console box and the floor tunnel portion. Specifically, inside the floor tunnel portion, the tunnel upper reinforcement member is disposed along the vehicle width direction in a position between the right and left front cross members and opposing the console box. At the time of a side impact to the vehicle and when the impact load is transmitted from a front cross member via the floor tunnel portion to the tunnel upper reinforcement member, the impact load is transmitted via the floor tunnel portion to the entire floor panel.

However, in this technology, the front cross members and the stiffener are placed apart from each other in the vehicle front-rear direction. For this reason, there is more room for improvement in order to cause the impact load transmitted via a vehicle seat to the tunnel portion at the time of a side impact to the vehicle to be transmitted to the opposite side of the impact side.

SUMMARY

In consideration of the circumstances described above, the present disclosure provides a vehicle skeleton structure that efficiently transmits an impact load to the opposite side of the impact side.

One aspect of the present invention is a vehicle skeleton structure including: a tunnel portion that is disposed projecting upward in a vehicle vertical direction at a vehicle width direction central portion of a floor panel of a vehicle, and that extends in a vehicle front-rear direction, the tunnel portion including a pair of side wall portions opposing each other in the vehicle width direction, and an upper wall portion that interconnects upper end portions of the pair of side wall portions; a tunnel upper reinforcement member that covers the upper wall portion and the pair of side wall portions of the tunnel portion from an exterior of each and that is joined to the tunnel portion; and a cross member that bridges, along the vehicle width direction, the tunnel portion and a rocker that is disposed at a vehicle width direction outer side of the floor panel, and that extends in the vehicle front-rear direction, the cross member being directly or indirectly joined to the tunnel upper reinforcement member.

In the present aspect, the tunnel portion disposed projecting upward in the vehicle vertical direction in the vehicle width direction central portion of the floor panel of the vehicle extends in the vehicle front-rear direction. The tunnel upper reinforcement member is disposed on the tunnel portion, covers the upper wall portion and the pair of side wall portions of the tunnel portion from outside, and is joined to the tunnel portion. Furthermore, the rocker extending in the vehicle front-rear direction is disposed at the vehicle width direction outer side of the floor panel, and the cross member bridges, along the vehicle width direction, the rocker and the tunnel portion.

Here, the cross member is directly or indirectly joined to the tunnel upper reinforcement member. Because of this, for example, in a case in which an impact load has been input to the rocker by a side impact to the vehicle, the impact load transmitted to the cross member can be transmitted to the tunnel portion and the tunnel upper reinforcement member.

In this way, because the impact load is transmitted to the tunnel portion, the impact load is transmitted via the tunnel portion to a cross member at the opposite side of the impact side, and the impact load is also transmitted along the vehicle front-rear direction via the tunnel portion. That is, the impact load can be dispersed via the tunnel portion so that local concentration can be controlled.

Here, the strength and rigidity of the tunnel portion are high in the section where the tunnel upper reinforcement member is joined. For this reason, by directly or indirectly joining the cross member to the tunnel upper reinforcement member, the load transmission efficiency can be raised compared to a case in which the cross member is joined to another section of the tunnel portion.

Furthermore, the statement "covers the upper wall portion and the pair of side wall portions of the tunnel portion from outside" means that the tunnel upper reinforcement member covers the upper wall portion of the tunnel portion from the upper side in the vehicle vertical direction and covers the side wall portions of the tunnel portion from the vehicle width direction outer sides of the tunnel portion.

As described above, in the vehicle skeleton structure of the present aspect, the impact load can be efficiently transmitted to the opposite side of the impact side.

The present aspect may further include a coupling member that couples the cross member and the tunnel upper reinforcement member to each other, wherein the cross member is indirectly joined via the coupling member to the tunnel upper reinforcement member.

In the above configuration, the cross member is indirectly joined via the coupling member to the tunnel upper reinforcement member. For this reason, compared to a case in which the cross member is directly joined to the tunnel upper reinforcement member, it is not necessary to make the shape of the cross member complex. Furthermore, an existing cross member can be used as is.

In this way, in the above configuration, by separately disposing the coupling member that couples the cross member and the tunnel upper reinforcement member to each other, the vehicle skeleton structure can be applied to an existing floor panel.

In the present aspect, the coupling member may be joined to an end portion of the cross member at a tunnel portion side and to a side wall portion of the tunnel upper reinforcement member, and the coupling member and the cross member form a first closed cross-section portion.

In the above configuration, the coupling member is joined to the end portion of the cross member at the tunnel portion side and to a side wall portion of the tunnel upper reinforcement member, and the coupling member forms, with the cross member, the first closed cross section portion. Because of this, the rigidity of the coupling member can be improved compared to a case in which the cross section formed by the coupling member and the cross member is an open cross section.

In this way, in the above configuration, the rigidity of the coupling member itself can be improved and the load transmission efficiency can be raised.

In the present aspect, the coupling member and the tunnel upper reinforcement member may form a second closed cross-section portion.

In the above configuration, since the second closed cross section portion is formed by the coupling member and the tunnel upper reinforcement member, the rigidity of the coupling member can be further improved compared to a case in which the cross section formed by the coupling member and the tunnel upper reinforcement member is an open cross section.

In this way, in the above configuration, the rigidity of the coupling member can be further improved and the load transmission efficiency can be further raised.

In the present aspect, the coupling member may have a quadrangular box shape and may include: a front wall portion that is disposed along the vehicle width direction at a vehicle front-rear direction front side of the coupling member, a rear wall portion that is disposed along the vehicle width direction at a vehicle front-rear direction rear side of the coupling member and that opposes the front wall portion, an upper wall portion that is disposed at a vehicle vertical direction upper portion of the coupling member and that interconnects the front wall portion and the rear wall portion, and a side wall portion that is disposed at a rocker side of the coupling member and that interconnects the upper wall portion, the front wall portion, and the rear wall portion.

In the above configuration, the coupling member is formed in a quadrangular box shape and includes the front wall portion, the rear wall portion, the upper wall portion, and the side wall portion. The front wall portion of the coupling member is placed at the front side in the vehicle front-rear direction of the coupling member and is disposed along the vehicle width direction. The rear wall portion is placed along the vehicle width direction at the rear side in the vehicle front-rear direction of the coupling member and opposes the front wall portion. Furthermore, the upper wall portion that interconnects the front wall portion and the rear wall portion is placed at the upper portion in the vehicle vertical direction of the coupling member, and the side wall portion that interconnects the upper wall portion, the front wall portion, and the rear wall portion is placed at the rocker side of the coupling member.

In the above configuration, as mentioned above, since the coupling member has a quadrangular box shape, plural ridgeline portions are formed between adjacent wall portions in the coupling member. In this way, because ridgeline portions are formed in the coupling member, the strength and rigidity of the coupling member can be improved. Furthermore, because the impact load is transmitted along the ridgeline portions, the load transmission efficiency can be improved.

In the present aspect, the cross member and the floor panel may form a third closed cross-section portion, and the cross member may include: a front wall portion that is disposed along the vehicle width direction at a vehicle front-rear direction front side of the cross member, a rear wall portion that is disposed along the vehicle width direction at a vehicle front-rear direction rear side of the cross member and that opposes the front wall portion, and an upper wall portion that is disposed at a vehicle vertical direction upper portion of the cross member and that interconnects the front wall portion and the rear wall portion, and at least a first ridgeline portion, formed by the front wall portion and the side wall portion of the coupling member, and a second ridgeline portion, formed by the front wall portion and the upper wall portion of the cross member, are configured so as to be substantially continuous in the vehicle width direction.

In the above aspect, since the third closed cross section portion is formed by the cross member and the floor panel, the rigidity of the cross member can be improved compared to a case in which the cross section formed by the cross member and the floor panel is an open cross section.

Furthermore, the cross member includes the front wall portion, the rear wall portion, and the upper wall portion. The front wall portion of the cross member is placed at the front side in the vehicle front-rear direction of the cross member and is disposed along the vehicle width direction. The rear wall portion is placed along the vehicle width direction at the rear side in the vehicle front-rear direction of the cross member and opposes the front wall portion. Furthermore, the upper wall portion that interconnects the front wall portion and the rear wall portion is placed on the vehicle vertical direction upper portion of the cross member.

Here, at least the first ridgeline portion formed by the front wall portion and the side wall portion of the coupling member is configured so as to be continuous in the vehicle width direction with the second ridgeline portion formed by the front wall portion and the upper wall portion of the cross member. That is, the first ridgeline portion of the coupling member is placed along an extension line of the second ridgeline portion of the cross member, and the second ridgeline portion of the cross member and the first ridgeline portion of the coupling member are continuously placed along the load transmission path.

For this reason, the impact load input to the rocker and transmitted to the cross member by a side impact to the vehicle is effectively transmitted from the second ridgeline portion of the cross member to the first ridgeline portion of the coupling member. Consequently, in the above configuration, the load transmission efficiency can be further improved compared to a case in which the second ridgeline portion of the cross member and the first ridgeline portion of the coupling member are not continuous along the load transmission path.

In this way, in the above configuration, the rigidity of the cross member can be improved and the load transmission efficiency can be raised.

Here, regarding the statement that the first ridgeline portion and the second ridgeline portion are "continuous in the vehicle width direction", the ridgeline portions referred here are not just what are called ridgelines but are regions including the ridgelines, and this concept also includes regions at the opposite sides of the ridgelines, along the plate thickness direction of the cross member and the coupling member. For example, in a case in which the coupling member is joined so as to cover the ridgeline of the cross member, the ridgeline of the coupling member that is continuous in the vehicle width direction with the ridgeline of the cross member strictly speaking ends up being out of alignment in the vehicle front-rear direction by an amount corresponding to the plate thickness of the coupling member so that the ridgeline of the coupling member is not continuous in the vehicle width direction with the ridgeline of the cross member. However, the "ridgeline portions" referred in the present disclosure are regions including the ridgelines, so even in this case also the ridgeline portions are "continuous in the vehicle width direction".

It should be noted that the relationships between the second ridgeline portion and a third ridgeline portion and between a fourth ridgeline portion and a fifth ridgeline portion described later are substantially the same as the relationship between the first ridgeline portion and the second ridgeline portion, so these ridgeline portions are also regions including the ridgelines. That is, a statement that two given ridgeline portions are "continuous" in the present disclosure means that the two given ridgeline portions are "substantially continuous", and it suffices for this to be in a range in which effects that are the same as the effects obtained in a case in which two given ridgeline portions are "continuous" are obtained.

In the present aspect, a third ridgeline portion formed by the front wall portion and the upper wall portion of the coupling member may be configured so as to be substantially continuous in the vehicle width direction with the second ridgeline portion of the cross member.

In the above configuration, the third ridgeline portion formed by the front wall portion and the upper wall portion of the coupling member is formed so as to be continuous in the vehicle width direction with the second ridgeline of the cross member. That is, the second ridgeline portion of the cross member and the third ridgeline portion of the coupling member are continuously placed along the load transmission path via the first ridgeline portion of the coupling member.

For this reason, the impact load input to the rocker and transmitted to the cross member by a side impact to the vehicle is transmitted from the second ridgeline portion of the cross member to the first ridgeline portion of the coupling member and thereafter is effectively transmitted to the third ridgeline portion of the coupling member. Consequently, in the above configuration, load transmission loss can be reduced compared to a case in which the second ridgeline portion of the cross member and the third ridgeline portion of the coupling member are not continuous along the load transmission path. Because of this, the efficiency with which the load is transmitted from the cross member via the coupling member to the tunnel portion can be further improved.

In the present aspect, a fourth ridgeline portion, that is positioned at a tunnel portion side of the upper wall portion of the coupling member and that is formed along the vehicle front-rear direction, may be configured so as to occupy substantially the same position in the vehicle vertical direction as a fifth ridgeline portion formed by the upper wall portion and the side wall portion of the tunnel portion or a sixth ridgeline portion formed by an upper wall portion and a side wall portion of the tunnel upper reinforcement member.

In the above configuration, the fourth ridgeline portion is formed along the vehicle front-rear direction at the tunnel portion side of the upper wall portion of the coupling member. Additionally, the fourth ridgeline portion is configured so as to occupy the same position in the vehicle vertical direction as the fifth ridgeline portion formed by the upper wall portion and a side wall portion of the tunnel portion or the sixth ridgeline portion formed by the upper wall portion and a side wall portion of the tunnel upper reinforcement member.

That is, the fourth ridgeline portion of the coupling member and the fifth ridgeline portion of the tunnel portion (or the sixth ridgeline portion of the tunnel upper reinforcement member) are continuously placed along the load transmission path. For this reason, the impact load input to the rocker and transmitted to the cross member by a side impact to the vehicle is effectively transmitted from the fourth ridgeline portion of the coupling member to the fifth ridgeline portion of the tunnel portion (or the sixth ridgeline portion of the tunnel upper reinforcement member).

Consequently, in the above configuration, the load transmission efficiency can be further improved compared to a case in which the fourth ridgeline portion of the coupling member and the fifth ridgeline portion of the tunnel portion (or the sixth ridgeline portion of the tunnel upper reinforcement member) are not continuous along the load transmission path.

Additionally, because the impact load is efficiently transmitted to the tunnel portion, the impact load is transmitted via the tunnel portion to the cross member at the opposite side of the impact side, and the impact load is also transmitted along the vehicle front-rear direction via the tunnel portion. That is, the impact load can be dispersed along the vehicle front-rear direction and the vehicle width direction via the tunnel portion so that local concentration can be controlled.

In this way, in the above configuration, the efficiency with which the load is transmitted from the tunnel upper reinforcement member to the tunnel portion can be raised and the impact load can be dispersed via the tunnel portion.

Here, as mentioned above, the ridgeline portions in the present disclosure are not just what are called ridgelines but are regions including ridgelines, and this concept also includes regions at the upper surface side and the lower surface side of the coupling member and the tunnel portion. Additionally, a statement that two given ridgeline portions occupy "the same position in the vehicle vertical direction" means that the two given ridgeline portions occupy "substantially the same position in the vehicle vertical direction", and it suffices for this to be in a range in which effects that are the same as the effects obtained in a case in which two given ridgeline portions occupy "the same position in the vehicle vertical direction" are obtained.

BRIEF DESCRIPTION OF THE DRAWINGS

Exemplary embodiments of the present disclosure will be described in detail based on the following figures, wherein.

DETAILED DESCRIPTION

Figure 1:
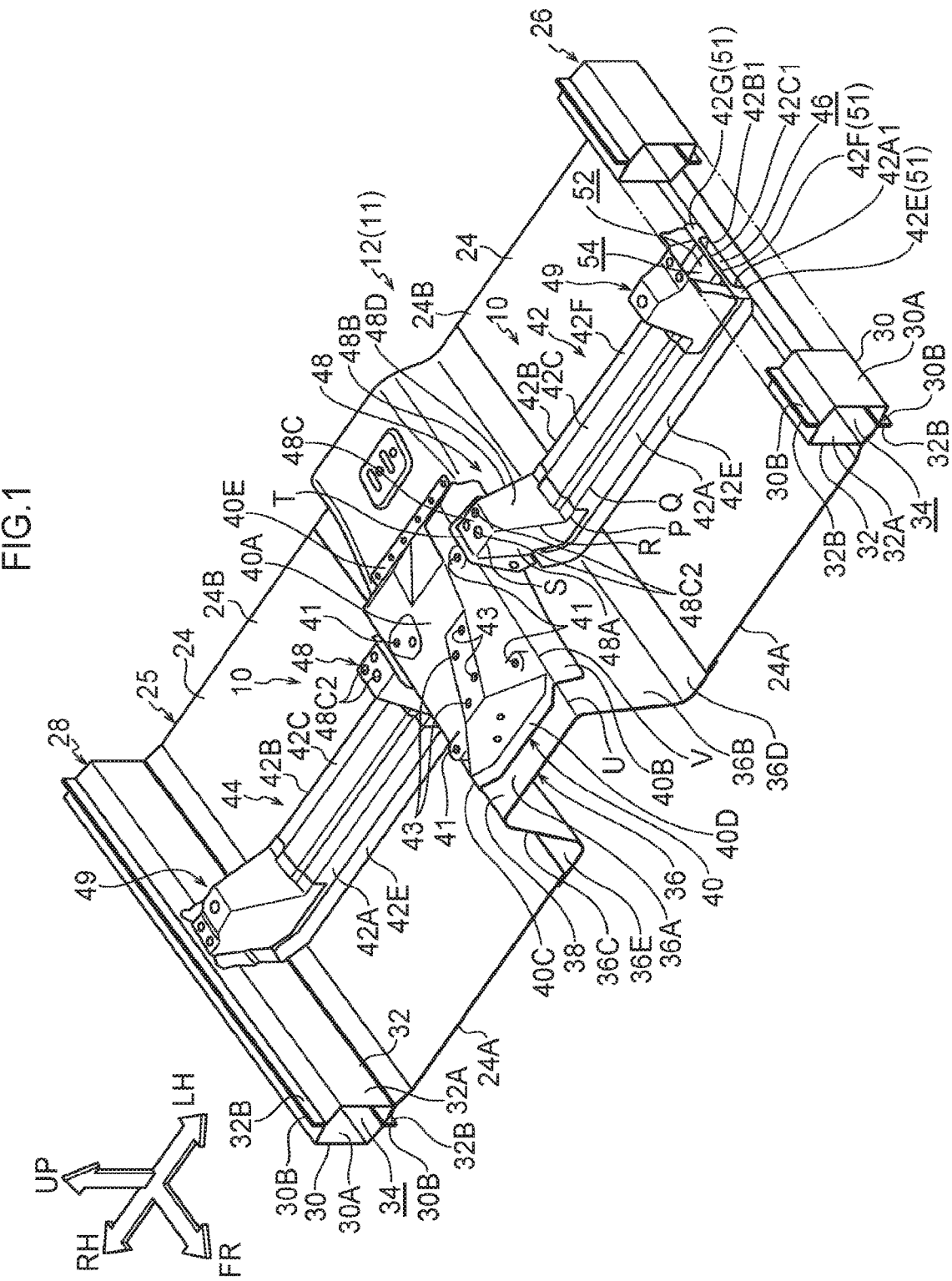
FIG. 1 is a perspective view showing a vehicle skeleton structure pertaining to the embodiment.

A vehicle skeleton structure 10 pertaining to an embodiment will be described on the basis of the drawings. It should be noted that arrow FR, arrow UP, arrow RH, and arrow LH shown in the drawings indicate a forward direction, an upward direction, a rightward direction, and a leftward direction, respectively, of a vehicle to which the vehicle skeleton structure 10 pertaining to the embodiment has been applied. When description is given below simply using the directions of front and rear, up and down, and right and left, unless otherwise specified these will be understood to mean front and rear in the vehicle front-rear direction, up and down in the vehicle vertical direction, and right and left when facing the forward direction.

(Configuration of Vehicle Skeleton Structure)

First, the configuration of the vehicle skeleton structure 10 pertaining to the present embodiment will be described.

Figure 2:
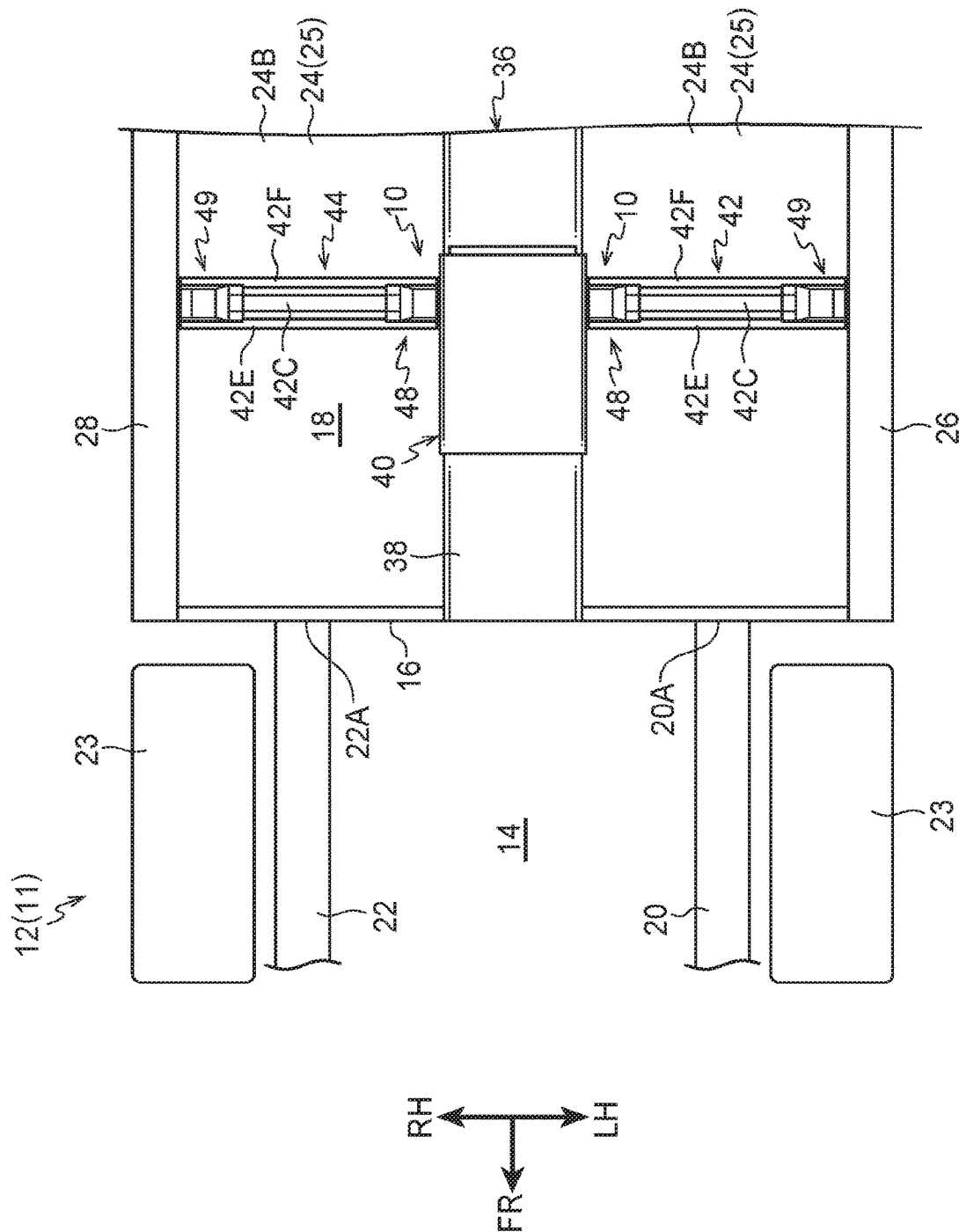
FIG. 2 is a plan view of a vehicle front portion including the vehicle skeleton structure pertaining to the embodiment.

As shown in FIG. 2, a power unit compartment 14 is disposed in a vehicle front portion 12, and the power unit compartment 14 is partitioned by a dash panel 16 from a cabin 18. A pair of front side members 20 and 22 is placed at the vehicle width direction outer sides of the power unit compartment 14, and tires 23 are disposed at the vehicle width direction outer sides of the front side members 20 and 22. Furthermore, the front side members 20 and 22 extend along the vehicle front-rear direction, and rear end portions 20A and 22A of the front side members 20 and 22 are bonded by welding, for example, to the dash panel 16.

It should be noted that, although it is not illustrated in the drawings, the front end portion of a floor panel 25 (see FIG. 1) configuring the floor portion of the cabin 18 is joined to the lower end portion of the dash panel 16, so that the dash panel 16 and the floor panel 25 are integrated. Furthermore, as for the joining in the present embodiment, including the following description, examples thereof include welding resulting from spot welding. Furthermore, the dash panel 16 and the floor panel 25 may be integrally formed.

Rockers 26 and 28 extend along the vehicle front-rear direction on both vehicle width direction sides of the floor panel 25. As shown in FIG. 1, each of the rockers 26 and 28 includes a rocker outer panel 30 disposed at the vehicle width direction outer side and a rocker inner panel 32 disposed at the vehicle width direction inner side.

The cross-sectional shapes of the rocker outer panel 30 and the rocker inner panel 32 when cut along the vehicle width direction are substantially hat shapes whose sides facing each other are open. Pairs of upper and lower flange portions 30B and 32B stick out along the vehicle vertical direction from the upper portion and the lower portion of a common portion 30A of each rocker outer panel 30 and a common portion 32A of each rocker inner panel 32. The flange portions 30B and 32B are joined to each other by welding, so that closed cross section portions 34 extending in the vehicle front-rear direction are formed in the rockers 26 and 28.

Here, the floor panel 25 is divided into the right and left sides of a vehicle body 11 and is configured by a pair of floor panels 24. A tunnel portion 36 extends along the vehicle front-rear direction in the vehicle width direction central portion of the floor panel 25 (between the two floor panels 24). The cross-sectional shape of the tunnel portion 36 when cut along the vehicle width direction is a substantially inverted U-shape that opens downward. The tunnel portion 36 includes an upper wall portion 36A and a pair of side wall portions 36B and 36C positioned on the right and left sides of the upper wall portion 36A.

The pair of side wall portions 36B and 36C are sloping wall portions that slope outward in the vehicle width direction heading downward from the vehicle width direction outside end portions of the upper wall portion 36A. Outer flange portions 36D and 36E bent toward the vehicle width direction outer sides of the tunnel portion 36 extend from the lower end portions of the side wall portions 36B and 36C, respectively.

Additionally, the outer flange portions 36D and 36E are joined to lower surfaces 24A of the floor panels 24. Because of this, the floor panels 24 and the tunnel portion 36 are integrated. The floor panels 24 and the tunnel portion 36 may be integrally formed.

A tunnel upper reinforcement 40 serving as a tunnel upper reinforcement member is joined to a front portion 38 of the tunnel portion 36. Specifically, the cross-sectional shape of the tunnel upper reinforcement 40 when cut along the vehicle width direction is a substantially inverted U-shape that opens downward, and the tunnel upper reinforcement 40 includes an upper wall portion 40A and a pair of side wall portions 40B and 40C positioned at the right and left sides of the upper wall portion 40A.

The upper wall portion 40A of the tunnel upper reinforcement 40 is brought into contact with the upper wall portion 36A of the tunnel portion 36, and the side wall portions 40B and 40C of the tunnel upper reinforcement 40 are brought into contact with the side wall portions 36B and 36C of the tunnel portion 36, respectively. The central portion of the vehicle front-rear direction front portion side of the upper wall portion 40A of the tunnel upper reinforcement 40 bulges upward, so that a non-illustrated closed cross section portion is formed between the upper wall portion 40A of the tunnel upper reinforcement 40 and the upper wall portion 36A of the tunnel portion 36.

Furthermore, a front flange portion 40D is formed at the front portion of the upper wall portion 40A of the tunnel upper reinforcement 40, and a rear flange portion 40E is formed at the rear portion of the upper wall portion 40A. The front flange portion 40D and the rear flange portion 40E of the tunnel upper reinforcement 40 are joined to the upper wall portion 36A of the tunnel portion 36, and the side wall portions 40B and 40C of the tunnel upper reinforcement 40 are joined to the side wall portions 36B and 36C, respectively, of the tunnel portion 36 so as to cover the tunnel portion 36 from outside.

Furthermore, plural seat portions 41 and mounting holes 43 are formed in the upper wall portion 40A of the tunnel upper reinforcement 40. A non-illustrated parking brake is mounted to the mounting holes 43, and a non-illustrated tunnel box interposed between the parking brake and the tunnel upper reinforcement 40 is secured to the seat portions 41.

Cross members 42 and 44 are disposed on upper surfaces 24B of the floor panels 24, with the tunnel portion 36 being placed between the cross members 42 and 44. Since the configurations of the cross member 42 and the cross member 44 are substantially the same, the cross member 42 will be described and description regarding the cross member 44 will be omitted. As there are cases in which it is easier to understand what is illustrated in the drawings by viewing from the cross member 44 side, the same reference signs as those assigned to the cross member 42 are assigned to the detailed parts of the cross member 44.

The cross member 42 bridges, along the vehicle width direction, the tunnel portion 36 and the rocker 26, and plural cross members 42 are disposed along the vehicle front-rear direction (only one is illustrated in the drawings). The cross-sectional shape of the cross member 42 when cut along the vehicle front-rear direction is a substantially inverted U-shape that opens downward.

Specifically, the cross member 42 includes a front wall portion 42A that is placed at the front portion of the cross member 42, a rear wall portion 42B that is placed at the rear portion of the cross member 42 and opposes the front wall portion 42A, and an upper wall portion 42C that is placed at the upper portion of the cross member 42 and interconnects the front wall portion 42A and the rear wall portion 42B. It should be noted that a projecting portion 42D (see FIG. 3) that projects upward is formed along the vehicle width direction in the upper wall portion 42C in the central portion thereof in its width direction orthogonal to its lengthwise direction (the vehicle width direction).

Furthermore, a front flange portion 42E bent forward extends from the lower end portion of the front wall portion 42A, and a rear flange portion 42G (see FIG. 2) bent rearward extends from the lower end portion of the rear wall portion 42B. Additionally, the front flange portion 42E and the rear flange portion 42G are bonded by welding, for example, to the upper surface 24B of the floor panel 24. Because of this, a closed cross section portion 46 serving as a third closed cross section portion is formed between the cross member 42 and the floor panel 24.

Furthermore, at the rocker 26 side of the cross member 42, a front flange portion 42E that is bent outward relative to the front wall portion 42A from an outer end portion 42A1 of the front wall portion 42A and extends along the vehicle front-rear direction is formed. Furthermore, at the rocker 26 side of the cross member 42, an upper flange portion 42F that is bent outward relative to the upper wall portion 42C from an outer end portion 42C1 of the upper wall portion 42C and extends along the vehicle vertical direction is formed. Moreover, at the rocker 26 side of the cross member 42, a rear flange portion 42G that is bent outward relative to the rear wall portion 42B from an outer end portion 42B1 of the rear wall portion 42B and extends along the vehicle front-rear direction is formed. The front flange portion 42E, the upper flange portion 42F, and the rear flange portion 42G are integrated to form a joint portion 51 having a substantially inverted U-shape as seen in a side view seen from the rocker 26 side. The joint portion 51 is bonded by welding, for example, to the rocker inner panel 32.

Figure 3:
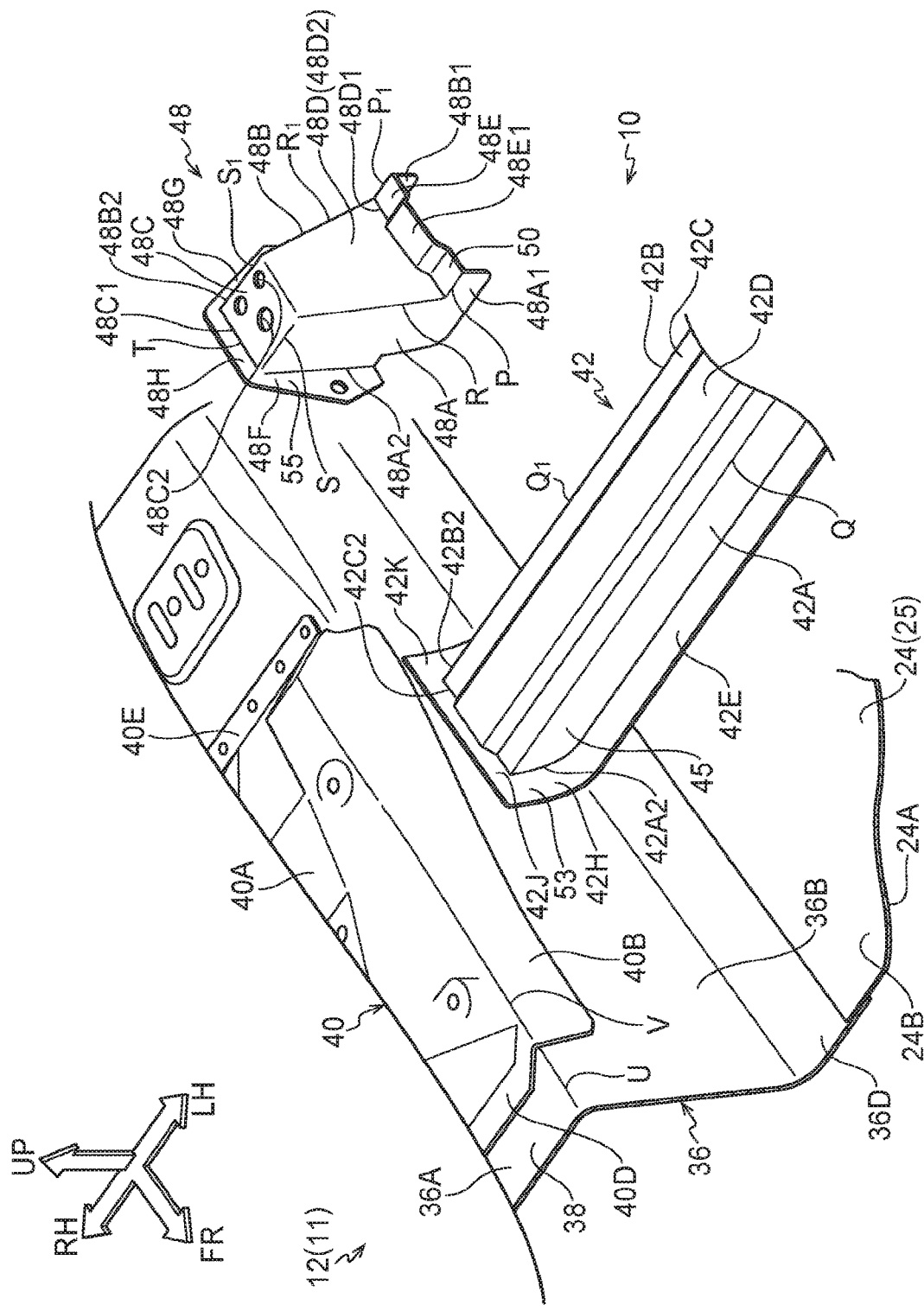
FIG. 3 is an exploded perspective view showing main portions of the vehicle skeleton structure pertaining to the embodiment.

As shown in FIG. 3, at the tunnel portion 36 side of the cross member 42, a front flange portion 42H that is bent outward relative to the front wall portion 42A from an outer end portion 42A2 of the front wall portion 42A and extends along the vehicle front-rear direction is formed. Furthermore, at the tunnel portion 36 side of the cross member 42, an upper flange portion 42J that is bent outward relative to the upper wall portion 42C from an outer end portion 42C2 of the upper wall portion 42C and extends along the vehicle vertical direction is formed. Moreover, at the tunnel portion 36 side of the cross member 42, a rear flange portion 42K that is bent outward relative to the rear wall portion 42B from an outer end portion 42B2 of the rear wall portion 42B and extends along the vehicle front-rear direction is formed. The front flange portion 42H, the upper flange portion 42J, and the rear flange portion 42K are integrated to form a joint portion 53 having a substantially inverted U-shape as seen in a side view seen from the tunnel portion 36 side. The joint portion 53 is bonded by welding, for example, to the side wall portion 36B of the tunnel portion 36. In the way described above, the cross member 42 bridges, along the vehicle width direction, the rocker 26 and the tunnel portion 36.

The cross member 42 is disposed between the tunnel portion 36 and the rocker 26, and a bracket 48 serving as a coupling member is interposed between the tunnel upper reinforcement 40 and the cross member 42. Furthermore, a bracket 49 (see FIG. 1) is interposed between the cross member 42 and the rocker 26. The brackets 48 and 49 are seat brackets, and are members that are disposed at the cross member 42 and support a non-illustrated seat on which an occupant sits. However, it is not necessary for the bracket 48 serving as a coupling member in the present embodiment to double as a seat bracket.

In the present embodiment, the bracket 48 and the bracket 49 slightly differ in shape but their basic configurations are substantially the same, so the bracket 48 serving as a coupling member will be described and description regarding the bracket 49 will be omitted. However, since there are cases in which it is easier to understand what is illustrated in the drawings by viewing from the bracket 49 side, reference signs that are the same as those assigned to the bracket 48 are assigned to the detailed parts of the bracket 49.

As shown in FIG. 1 and FIG. 3, the bracket 48 has a substantially quadrangular box shape. Specifically, the bracket 48 includes a front wall portion 48A, which is placed at the front portion of the bracket 48, and a rear wall portion 48B, which is placed at the rear portion of the bracket 48 and opposes the front wall portion 48A. Moreover, the bracket 48 includes an upper wall portion 48C, which is placed at the upper portion of the bracket 48 and interconnects the front wall portion 48A and the rear wall portion 48B, and a side wall portion 48D, which is placed at the rocker 26 side and interconnects the front wall portion 48A, the rear wall portion 48B, and the upper wall portion 48C.

An outer flange portion 48E that is bent toward the outer side of the bracket 48 from a lower end portion 48D1 of the side wall portion D and extends along the vehicle width direction is formed. A projecting portion 48E1 that projects upward in conformity to the shape of the projecting portion 42D formed in the upper wall portion 42C of the cross member 42 is formed in the outer flange portion 48E.

Furthermore, the outer flange portion 48E is formed integrally with the front wall portion 48A and the rear wall portion 48B. That is, an extension piece 48A1 that sticks out from an outer surface 48D2 of the side wall portion 48D and extends along the vehicle width direction is formed at the front wall portion 48A, and an extension piece 48B1 that sticks out from the outer surface 48D2 of the side wall portion 48D and extends along the vehicle width direction is formed at the rear wall portion 48B. The extension piece 48A1, the outer flange portion 48E, and the extension piece 48B1 are integrated to form a joint portion 50 having a substantially inverted U-shape as seen in a side view seen from the side wall portion 48D side. The joint portion 50 is bonded by welding, for example, to the cross member 42.

That is, the extension piece 48A1, the outer flange portion 48E, and the extension piece 48B1 of the joint portion 50 are joined to the front wall portion 42A, the upper wall portion 42C, and the rear wall portion 42B, respectively, of the cross member 42. In this state, a closed cross section portion 52 serving as a first closed cross section portion (see the bracket 49 side shown in FIG. 1) is formed by the bracket 48 and the cross member 42.

On the tunnel upper reinforcement 40 side of the bracket 48, a front flange portion 48F that is bent outward relative to the front wall portion 48A from an open end portion 48A2 of the front wall portion 48A and extends along the vehicle front-rear direction is formed. A rear flange portion 48G that is bent outward relative to the rear wall portion 48B from an open end portion 48B2 of the rear wall portion 48B of the bracket 48 and extends along the vehicle front-rear direction is formed. An upper flange portion 48H that is bent outward relative to the upper wall portion 48C from an open end portion 48C1 of the upper wall portion 48C of the bracket 48 and extends along the vehicle front-rear direction is formed. The front flange portion 48F, the rear flange portion 48G, and the upper flange portion 48H are integrated to form a joint portion 55 having a substantially inverted U-shape as seen in a side view seen from the side wall portion 48D side.

The joint portion 55 is joined by welding, for example, to the side wall portion 40B of the tunnel upper reinforcement 40, and in this state a closed cross section portion 54 serving as a second closed cross section portion (see the bracket 49 side shown in FIG. 1) is formed by the bracket 48 and the tunnel upper reinforcement 40.

In this way, the bracket 48 forms, with the cross member 42 and the tunnel upper reinforcement 40, closed cross section portions, and the closed cross section portion 54 serving as the second closed cross section portion is communicated with the closed cross section portion 52 serving as the first closed cross section portion. For this reason, the closed cross section portion 54 and the closed cross section portion 52 are the same space, but for convenience of description they are described using different reference signs.

Figure 4:
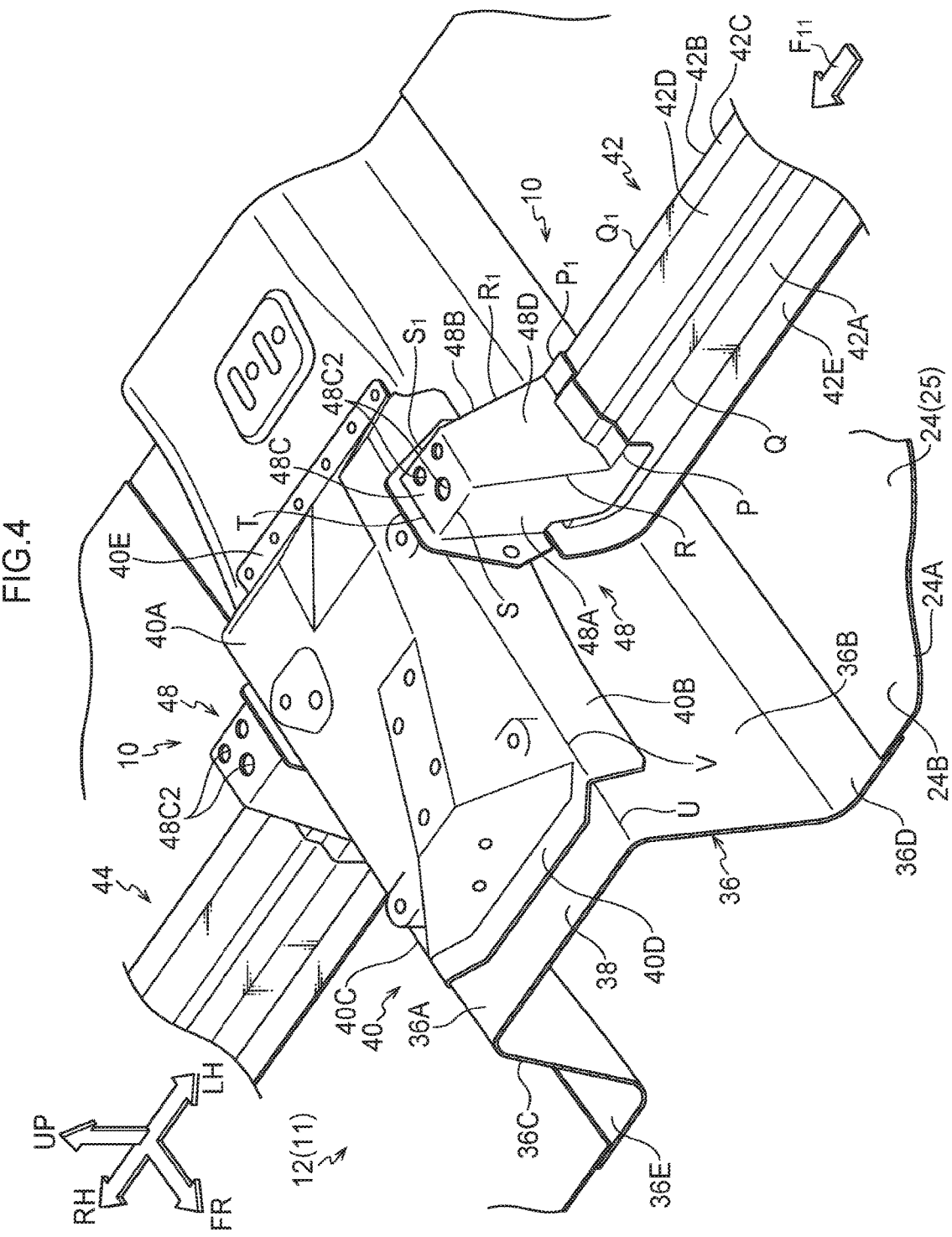
FIG. 4 is a perspective view showing the main portions of the vehicle skeleton structure pertaining to the embodiment.

Here, as shown in FIG. 3 and FIG. 4, in the joint portion 50 of the bracket 48, a ridgeline portion P formed by the extension piece 48A1 and the outer flange portion 48E is configured so as to be continuous in the vehicle width direction with a ridgeline portion Q serving as a second ridgeline portion formed by the front wall portion 42A and the upper wall portion 42C of the cross member 42.

It should be noted that, regarding the statement that the ridgeline portion P and the ridgeline portion Q are "continuous in the vehicle width direction", the ridgeline portions are not only referred to as the actual ridgelines but also the regions including the ridgelines. That is, the concept of the ridgeline portions also includes regions on the opposite sides of the ridgelines Q and P, along the plate thickness direction of the cross member 42 and the bracket 48.

For example, in a case in which the bracket 48 is joined so as to cover the ridgeline Q of the cross member 42, in a precise sense, the ridgeline P of the bracket 48 that is continuous in the vehicle width direction with the ridgeline Q of the cross member 42 is out of alignment in the vehicle front-rear direction by an amount corresponding to the plate thickness of the bracket 48 and the ridgeline P of the bracket 48 is not continuous in the vehicle width direction with the ridgeline Q of the cross member 48. However, since the ridgeline portions in the present embodiment refer to the regions including ridgelines, the above case is included in the case in which the ridgeline portions are "continuous in the vehicle width direction".

It should be noted that the relationships between a ridgeline portion R and the ridgeline portion Q and between a ridge portion S and the ridgeline portion Q are substantially the same as the relationship between the ridgeline portion P and the ridgeline portion Q, and these ridgeline portions also refers to the regions including ridgelines. That is, a statement that two given ridgeline portions are "continuous" in the present embodiment means that the two given ridgeline portions are "substantially continuous", and it suffices that the "substantially continuous" configuration is in a range in which the same effect can be obtained as in a case in which two given ridgeline portions are "continuous".

Furthermore, in the joint portion 50 of the bracket 48, a ridgeline portion $P_1$ formed by the outer flange portion 48E and the extension piece 48B1 is configured so as to be continuous in the vehicle width direction with a ridgeline portion $Q_1$ formed by the upper wall portion 42C and the rear wall portion 42B of the cross member 42.

Moreover, a ridgeline portion R serving as a first ridgeline portion formed by the front wall portion 48A and the side wall portion 48D of the bracket 48 is configured to be continuous with the ridgeline portion P and continuous in the vehicle width direction with the ridgeline portion Q of the cross member 42. A ridgeline portion $R_1$ formed by the side wall portion 48D and the rear wall portion 48B of the bracket 48 is configured to be continuous with the ridgeline portion $P_1$ and continuous in the vehicle width direction with the ridgeline portion $Q_1$ of the cross member 42.

A ridgeline portion S serving as a third ridgeline portion formed by the front wall portion 48A and the upper wall portion 48C of the bracket 48 is formed continuous in the vehicle width direction with the ridgeline portion Q of the cross member 42.

A ridgeline portion T serving as a fourth ridgeline portion that is the open end portion 48C1 of the upper wall portion 48C of the bracket 48 is configured so as to occupy the same position in the vehicle vertical direction as a ridgeline U serving as a fifth ridgeline portion formed by the upper wall portion 36A and the side wall portion 36B of the tunnel portion 36. The ridgeline portion T of the bracket 48 may also be configured so as to occupy the same position in the vehicle vertical direction as a ridgeline portion V serving as a sixth ridgeline portion formed by the upper wall portion 40A and the side wall portion 40B of the tunnel upper reinforcement 40.

As mentioned above, in regard to the ridgeline portion T, the ridgeline portion U, and the ridgeline portion V, the ridgeline portions in the present embodiment are not only the actual ridgelines but also includes the regions around the ridgelines. That is, the concept of "ridgelines" includes regions on the upper surface side and the reverse surface side of the upper wall portion 48C of the bracket 48, the upper wall portion 36A of the tunnel portion 36, and the upper wall portion 40A of the tunnel upper reinforcement 40. The statement that the ridgeline portion T and the ridgeline portion U or the ridgeline portion V occupy the "same position in the vehicle vertical direction" means "substantially the same position in the vehicle vertical direction", and it suffices for this to be in a range in which the same effects can be obtained as in a case in which the two ridgeline portions occupy "the same position in the vehicle vertical direction".

(Operation and Effects of Vehicle Skeleton Structure)

Next, the operation and effects of the vehicle skeleton structure 10 pertaining to the present embodiment will be described.

As shown in FIG. 1, in the present embodiment, the tunnel upper reinforcement 40 is joined to the front portion 38 of the tunnel portion 36 and, therefore, the strength and rigidity of the tunnel portion 36 are high. The cross member 42 that bridges, along the vehicle width direction, the tunnel portion 36 and the rocker 26 is indirectly joined via the bracket 48 to the tunnel upper reinforcement 40.

Figure 5:
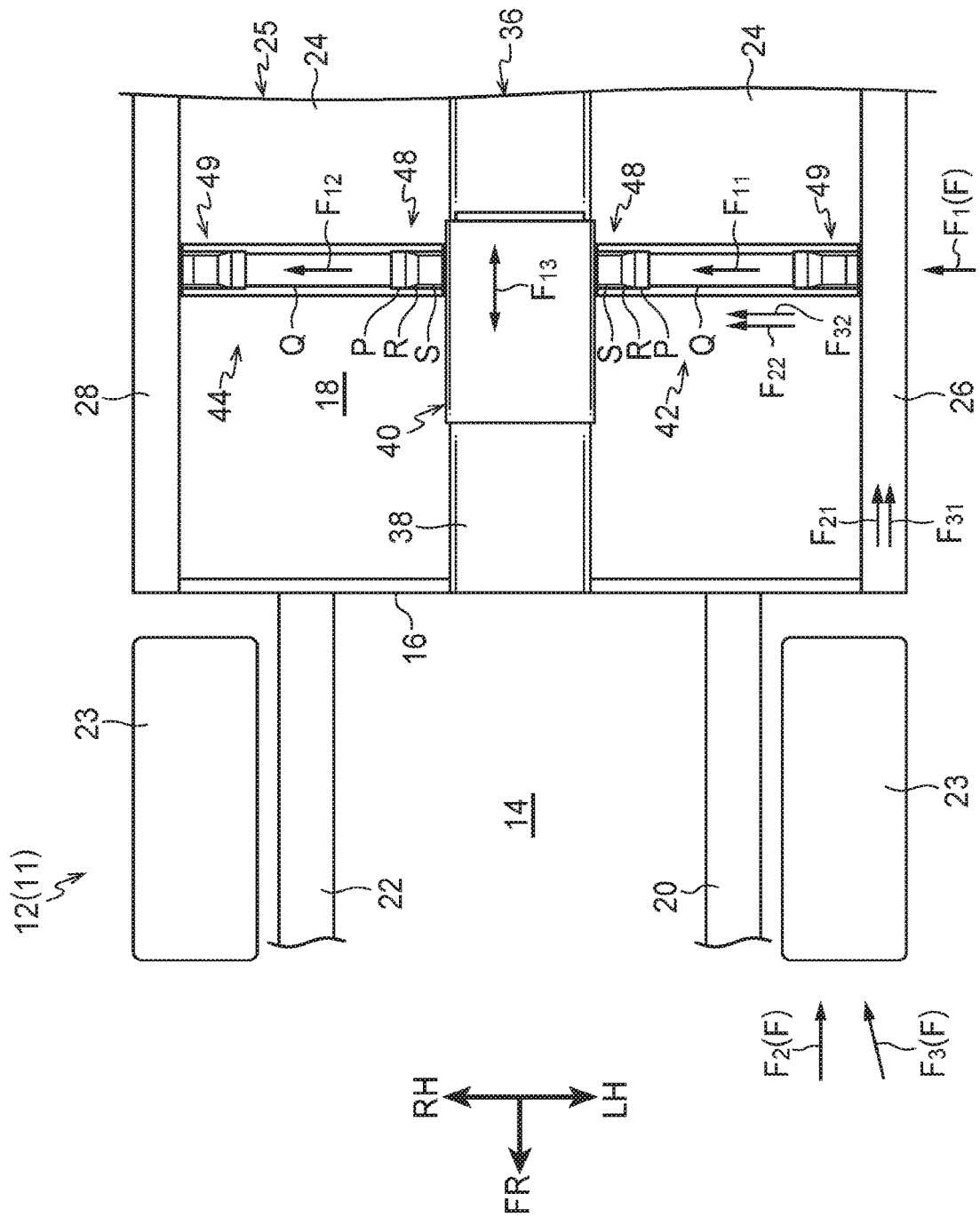
FIG. 5 is a plan view, corresponding to FIG. 2, for describing the action of the vehicle skeleton structure pertaining to the embodiment.

Therefore, for example, as shown in FIG. 5, in a case in which an impact load $F_1$ has been input to the rocker 26 by a side impact to the vehicle body (vehicle) 11, an impact load $F_{11}$ transmitted via the rocker 26 to the cross member 42 can be transmitted to the tunnel upper reinforcement 40 and the tunnel portion 36.

Because the impact load $F_{11}$ is transmitted to the tunnel portion 36, an impact load $F_{12}$ is transmitted via the tunnel portion 36 to the cross member 44 on the opposite side of the impact side, and an impact load $F_{13}$ is also transmitted along the vehicle front-rear direction via the tunnel portion 36. That is, the impact load $F_{11}$ can be dispersed via the tunnel portion 36 into the impact loads $F_{12}$, $F_{13}$, and the like so that local concentration can be controlled.

Examples of impact types include, in addition to a side impact, a case in which an impactor impacts on the vehicle front surface from the vehicle width direction outer side of the front side member 20 (what is called a small overlap impact; impact load $F_2$) and a case in which an impactor diagonally impacts on the vehicle front surface from the vehicle width direction outer side of the front side member 20 (what is called an oblique impact; impact load $F_3$).

Even in a case in which the impact load $F_2$ or the impact load $F_3$ has been input to the vehicle body 11 by these kinds of impact type, an impact load $F_{21}$ or an impact load $F_{31}$ transmitted to the rocker 26 is transmitted to the cross member 42 (an impact load $F_{22}$ or an impact load $F_{32}$). Similarly to the case of a side impact, the impact load $F_{22}$ or the impact load $F_{32}$ can be transmitted from the tunnel upper reinforcement 40 to the tunnel portion 36 so that local concentration can be controlled.

In the present embodiment, a seat bracket (the bracket 48) is used as a coupling member that joins the cross member 42 and the tunnel upper reinforcement 40 to each other. That is, a member for supporting a seat doubles as the coupling member. Therefore, as shown in FIG. 4, plural fastening holes 48C2 for securing the seat are formed in the upper wall portion 48C of the bracket 48. In this way, because a member for supporting a seat doubles as the coupling member, an increase in the number of parts and an increase in costs can be controlled compared to a case in which the coupling member is separately disposed.

Furthermore, as shown in FIG. 1 and FIG. 3, because the tunnel upper reinforcement 40 is joined to the front portion 38 of the tunnel portion 36, the strength and rigidity of the tunnel portion 36 are high. Therefore, by directly or indirectly joining the cross member 42 to the tunnel upper reinforcement 40, the load transmission efficiency can be raised compared to a case in which the cross member 42 is joined to another section of the tunnel portion 36.

In the present embodiment, the vehicle skeleton structure 10 is disposed with the bracket 48 that couples the tunnel upper reinforcement 40 and the cross member 42 to each other, and the cross member 42 is joined via the bracket 48 to the tunnel upper reinforcement 40. That is, the cross member 42 is indirectly joined to the tunnel upper reinforcement 40.

For this reason, compared to a case in which the cross member 42 is directly joined to the tunnel upper reinforcement 40, it is not necessary to make the shape of the cross member 42 complex. Furthermore, although it is not illustrated in the drawings, an existing cross member can be used as is, so versatility is high in existing car models.

In the present embodiment, the bracket 48 is joined (coupled) to an end portion 45 of the cross member 42 on the tunnel portion 36 side and to the side wall portion 40B of the tunnel upper reinforcement 40 and, with the cross member 42, forms the closed cross section portion 52 (see the bracket 49 side shown in FIG. 1). Therefore, although it is not illustrated in the drawings, compared to a case in which the cross section formed by the bracket 48 and the cross member 42 is an open cross section, the rigidity of the bracket 48 itself can be improved and the load transmission efficiency can be raised.

The second closed cross section portion 54 (see the bracket 49 side shown in FIG. 1) is formed by the bracket 48 and the tunnel upper reinforcement 40. That is, the bracket 48, the cross member 42 and the tunnel upper reinforcement 40 form the closed cross section portions 52 and 54. Therefore, although it is not illustrated in the drawings, compared to a case in which the cross section formed by the bracket 48 and the cross member 42 or the tunnel upper reinforcement 40 is an open cross section, the rigidity of the bracket 48 can be further improved and the load transmission efficiency can be further raised.

In the present embodiment, the bracket 48 is shaped like a quadrangular box, and the plural ridgeline portions P, R, S and the like are formed along the vehicle width direction in the bracket 48. In this way, because the ridgeline portions P, R, S and the like are formed in the bracket 48, the strength and rigidity of the bracket 48 can be improved. Furthermore, because the impact load $F_{11}$ (see FIG. 4) is transmitted along the ridgeline portions P, R, S and the like, the load transmission efficiency can be further improved.

Here, the ridgeline portion R formed in the bracket 48 is formed so as to be continuous with the ridgeline P and continuous in the vehicle width direction with the ridgeline portion Q formed in the cross member 42. That is, the ridgeline portions P and R of the bracket 48 are placed on an extension line of the ridgeline portion Q of the cross member 42, and the ridgeline portion Q of the cross member 42 and the ridgeline portions P and R of the bracket 48 are continuously placed on the load transmission path.

For this reason, as shown in FIG. 5, the impact load $F_{11}$ input to the rocker 26 and transmitted to the cross member 42 by a side impact to the vehicle body 11 is effectively transmitted from the ridgeline portion Q of the cross member 42 to the ridgeline portion P of the bracket 48. Consequently, in the present embodiment, the load transmission efficiency can be further improved compared to a case in which the ridgeline portion Q of the cross member 42 and the ridgeline portion P of the bracket 48 are not continuous on the load transmission path.

In the present embodiment, as shown in FIG. 3, the ridgeline portion $R_1$ formed in the bracket 48 is formed so as to be continuous with the ridgeline portion $P_1$ and continuous in the vehicle width direction with the ridgeline portion $Q_1$ formed in the cross member 42. Therefore, because the ridgeline portion $P_1$ that is continuous with the ridgeline portion $Q_1$ of the cross member 42 is also formed in the bracket 48, effects that are substantially the same as the effects in the case of forming the ridgeline portion P that is continuous with the ridgeline portion Q of the cross member 42 are obtained.

In the present embodiment, as shown in FIG. 4, the ridgeline portion S formed in the bracket 48 is formed so as to be continuous in the vehicle width direction with the ridgeline portion Q formed in the cross member 42. That is, the ridgeline portion S of the bracket 48 is continuous in the vehicle width direction with the ridgeline portions P and R, and the ridgeline portion Q of the cross member 42 and the ridgeline portion S of the bracket 48 are continuously placed on the load transmission path via the ridgeline portions P and R of the bracket 48.

Here, the side wall portion 48D has a substantially trapezoidal shape as seen in a front view of the bracket 48 and is formed such that its upper portion side is narrower than its lower portion side. For this reason, the ridgeline portion S is placed slightly on the vehicle front-rear direction rear side of the ridgeline P, but in view of the meaning of "substantially continuous" described above, the ridgeline portion S of the bracket 48 and the ridgeline portion Q of the cross member 42 are regarded as being continuous in the vehicle width direction.

Therefore, as shown in FIG. 5, the impact load $F_{11}$ input to the rocker 26 and transmitted to the cross member 42 by a side impact to the vehicle body 11 is transmitted from the ridgeline portion Q of the cross member 42 to the ridgeline portion P of the bracket 48 and thereafter is effectively transmitted to the ridgeline portion S of the bracket 48. Consequently, in the present embodiment, the load transmission efficiency can be further improved compared to a case in which the ridgeline portion Q of the cross member 42 and the ridgeline portion S of the bracket 48 are not continuous on the load transmission path.

In the present embodiment, as shown in FIG. 3, the ridgeline portion $S_1$ formed in the bracket 48 is formed so as to be continuous in the vehicle width direction with the ridgeline portion $Q_1$ formed in the cross member 42. That is, the ridgeline portion $S_1$ of the bracket 48 is continuous in the vehicle width direction with the ridgeline portions $P_1$ and $R_1$, and the ridgeline portion $Q_1$ of the cross member 42 and the ridgeline portion $S_1$ of the bracket 48 are continuously placed on the load transmission path via the ridgeline portions $P_1$ and $R_1$ of the bracket 48. For this reason, because the ridgeline portions $P_1$, $R_1$, and $S_1$ that are continuous with the ridgeline portion $Q_1$ of the cross member 42 are also formed in the bracket 48, effects that are substantially the same as the effects in the case of forming the ridgeline portions P, R, and S that are continuous with the ridgeline portion Q of the cross member 42 are obtained.

Moreover, in the present embodiment, as shown in FIG. 4, the ridgeline portion T of the bracket 48 is configured so as to occupy the same position in the vehicle vertical direction as the ridgeline portion U of the tunnel portion 36. Therefore, the ridgeline portion T of the bracket 48 and the ridgeline portion V of the tunnel upper reinforcement 40 are continuously placed on the load transmission path.

Consequently, as shown in FIG. 5, the impact load $F_{11}$ input to the rocker 26 and transmitted to the cross member 42 by a side impact to the vehicle body 11 is effectively transmitted from the upper wall portion 48C of the bracket 48 to the upper wall portion 40A of the tunnel upper reinforcement 40. Because of this, in the present embodiment, the load transmission efficiency can be further improved compared to a case in which the ridgeline portion T of the bracket 48 and the ridgeline portion U of the tunnel upper reinforcement 40 are not continuous on the load transmission path.

Here, the tunnel upper reinforcement 40 covers and is joined to the tunnel portion 36. For this reason, because the impact load $F_{11}$ is efficiently transmitted to the tunnel portion 36, the impact load $F_{12}$ is transmitted via the tunnel portion 36 to the cross member 44 on the opposite side of the impact side, and the impact load $F_{13}$ is also transmitted along the vehicle front-rear direction via the tunnel portion 36. That is, the impact load $F_{11}$ can be dispersed along the vehicle front-rear direction and the vehicle width direction via the tunnel portion 36 so that local concentration can be controlled.

For example, although it is not illustrated in the drawings, when an impact load is transmitted from the cross member 42 to the tunnel portion 36 at the time of a small overlap impact or a side impact and the tunnel portion 36 has deformed, there are cases in which spot separation of the floor panel 24 occurs. For this reason, in order to control deformation of the tunnel portion 36, usually a method is employed in which a reinforcement member (what is called a tunnel lower reinforcement) is joined to the lower portion of the tunnel portion 36.

However, in the case of a compact passenger car, a reinforcement member (what is called a tunnel upper reinforcement) may be joined to the lower side of the parking brake in order to reinforce the parking brake. In such cases, the tunnel upper reinforcement and the tunnel lower reinforcement are placed such that they coincide with each other as seen in a plan view, with the tunnel portion being placed between the tunnel upper reinforcement and the tunnel lower reinforcement, but in terms of production it is difficult to spot-bond these members to each other by welding.

For this reason, in the present embodiment, by causing the impact load F transmitted to the cross member 42 shown in FIG. 5 to be transmitted to the tunnel upper reinforcement 40, the impact load F can be dispersed via the tunnel portion 36 so that local concentration can be controlled. Because of this, according to the present embodiment, spot breaks in the floor panel 24 can be controlled or prevented, and this is particularly effective with respect to compact passenger cars. It should be noted that the impact load F here is used as a generic term including impact types in cases in which the impact load $F_1$, $F_2$, or $F_3$ is input.

Supplemental Description of the Embodiment

Moreover, in the present embodiment, an example is described in which, as shown in FIG. 1, the closed cross section portion 52 is formed by the bracket 48 and the cross member 42, the closed cross section portion 54 is formed by the bracket 48 and the tunnel upper reinforcement 40, and the closed cross section portion 52 and the closed cross section portion 54 are communicated with each other. However, the present embodiment is not limited to this. For example, the bracket 48 may also have a shape in which the closed cross section portion 52 and the closed cross section portion 54 are partitioned from each other. The bracket 48 may also have a shape in which only either one of the closed cross section portion 52 and the closed cross section portion 54 is formed.

Moreover, the bracket 48 is not limited to having a box shape and may also have a shape in which the closed cross section portion 52 and the closed cross section portion 54 are not formed. For example, although it is not illustrated in the drawings, a solid member may also be used for the bracket 48. In addition to this, for example, as the bracket 48 having a shape in which the closed cross section portion 52 is not formed, although it is not illustrated in the drawings, the side wall portion 48D may not be formed at the bracket 48. Furthermore, as the bracket 48 having a shape in which the closed cross section portion 54 is not formed, although it is not illustrated in the drawings, the front wall portion 48A or the rear wall portion 48B may not be formed at the bracket 48. That is, it suffices for the bracket to be disposed with a wall portion that transmits the impact load along the vehicle width direction between the cross member 42 and the tunnel upper reinforcement 40.

In the present embodiment, the cross member 42 forms, with the floor panel 24, the closed cross section portion 46, but the shape of the cross member 42 is not limited to this. For example, although it is not illustrated in the drawings, a solid member may also be used for the cross member 42.

In the present embodiment, as shown in FIG. 4, in the bracket 48, the ridgeline portions (P, R, and S) are formed in the adjacent wall portions (the front wall portion 48A, the side wall portion 48D, and the upper wall portion 48C), but the configuration is not limited to this. For example, although it is not illustrated in the drawings, ribs may also be formed on the wall portions of the bracket 48, and the ridgeline portions may be formed by the ribs. By forming the ribs, the rigidity of the bracket 48 becomes higher and the load transmission efficiency can be further improved.

In the present embodiment, the ridgeline portion S of the bracket 48 is formed so as to be continuous in the vehicle width direction with the ridgeline portion Q of the cross member 42. However, the configuration is not limited to this and it suffices for at least the ridgeline portion R of the bracket 48 to be formed so as to be continuous in the vehicle width direction with the ridgeline portion Q of the cross member 42.

For example, the ridgeline portion S of the bracket 48 may also be formed so as to occupy a position offset in the vehicle front-rear direction relative to the ridgeline portion P. This is because the entire front wall portion 48A can be used as a load transmission path to transmit the impact load $F_{11}$ to the tunnel portion 36. Therefore, although in the present embodiment, the upper portion side of the side wall portion 48D of the bracket 48 is formed so as to be narrower than the lower portion side of the side wall portion 48D, the upper portion side of the side wall portion 48D may also be formed so as to be wider than the lower portion side of the side wall portion 48D. In this case, although it is not illustrated in the drawings, the impact load from the cross member 42 is transmitted to the tunnel upper reinforcement 40 in a dispersed state.

In the present embodiment, as shown in FIG. 4, the ridgeline portions P, R, and S that are continuous with the ridgeline portion Q of the cross member 42 are formed in the bracket 48, and the ridgeline portions $P_1$, $R_1$, and $S_1$ that are continuous with the ridgeline portion $Q_1$ are also formed in the bracket 48. However, in consideration of impact types where the impact loads $F_2$ and $F_3$ (see FIG. 5) are input from the vehicle front side, a higher effect can be obtained by making the load transmission efficiency higher on the vehicle front-rear direction front portion side (the ridgeline portions P, R, and S) of the bracket 48 than on the rear portion side (the ridgeline portions $P_1$, $R_1$, and $S_1$). Consequently, it is not invariably necessary to form in the bracket 48 the ridgeline portions $P_1$, $R_1$, and $S_1$ that are continuous with the ridgeline portion $Q_1$ of the cross member 42.

Furthermore, since it suffices to be able to transmit the impact load from the cross member 42 to the tunnel upper reinforcement 40, it is not invariably necessary to form the ridgeline portions P, R, and S in the bracket 48. Similarly to the ridgeline portions P, R, and S, the ridgeline portion T of the bracket 48 is also not invariably necessary.

In the present embodiment, as shown in FIG. 2, an example is described in which the vehicle skeleton structure 10 pertaining to the present embodiment is applied to both vehicle width direction sides of each floor panel 24, but the vehicle skeleton structure 10 may also be disposed on just one vehicle width direction side of each floor panel 24.

In the present embodiment, as shown in FIG. 4, an example is described in which the tunnel upper reinforcement 40 is joined to the front portion 38 of the tunnel portion 36, but the region where the tunnel upper reinforcement 40 is joined is not limited to the front portion 38 of the tunnel portion 36. That is, although it is not illustrated in the drawings, it suffices for the tunnel upper reinforcement to be joined on the load transmission path of the cross member and the tunnel portion. Therefore, the tunnel upper reinforcement may also be joined to the rear portion of the tunnel portion Furthermore, the tunnel upper reinforcement may also be joined in plural places to the front portion and the rear portion of the tunnel portion and may also be joined spanning the tunnel portion from its front portion to its rear portion.

In the present embodiment, an example is described in which the tunnel upper reinforcement 40 is disposed on the upper side of the tunnel portion 36. However, the present embodiment is not limited to this and, although it is not illustrated in the drawings, is not limited to the upper side of the tunnel portion 36 and is also applicable even in a structure in which a tunnel lower reinforcement is also disposed on the lower side of the tunnel portion 36.

Other Embodiments

In the above embodiment, as shown in FIG. 4, the bracket 48 is interposed between the tunnel upper reinforcement 40 and the cross member 42, and the cross member 42 is indirectly joined via the bracket 48 to the tunnel upper reinforcement 40. However, the present embodiment is not limited to this.

Figure 6:
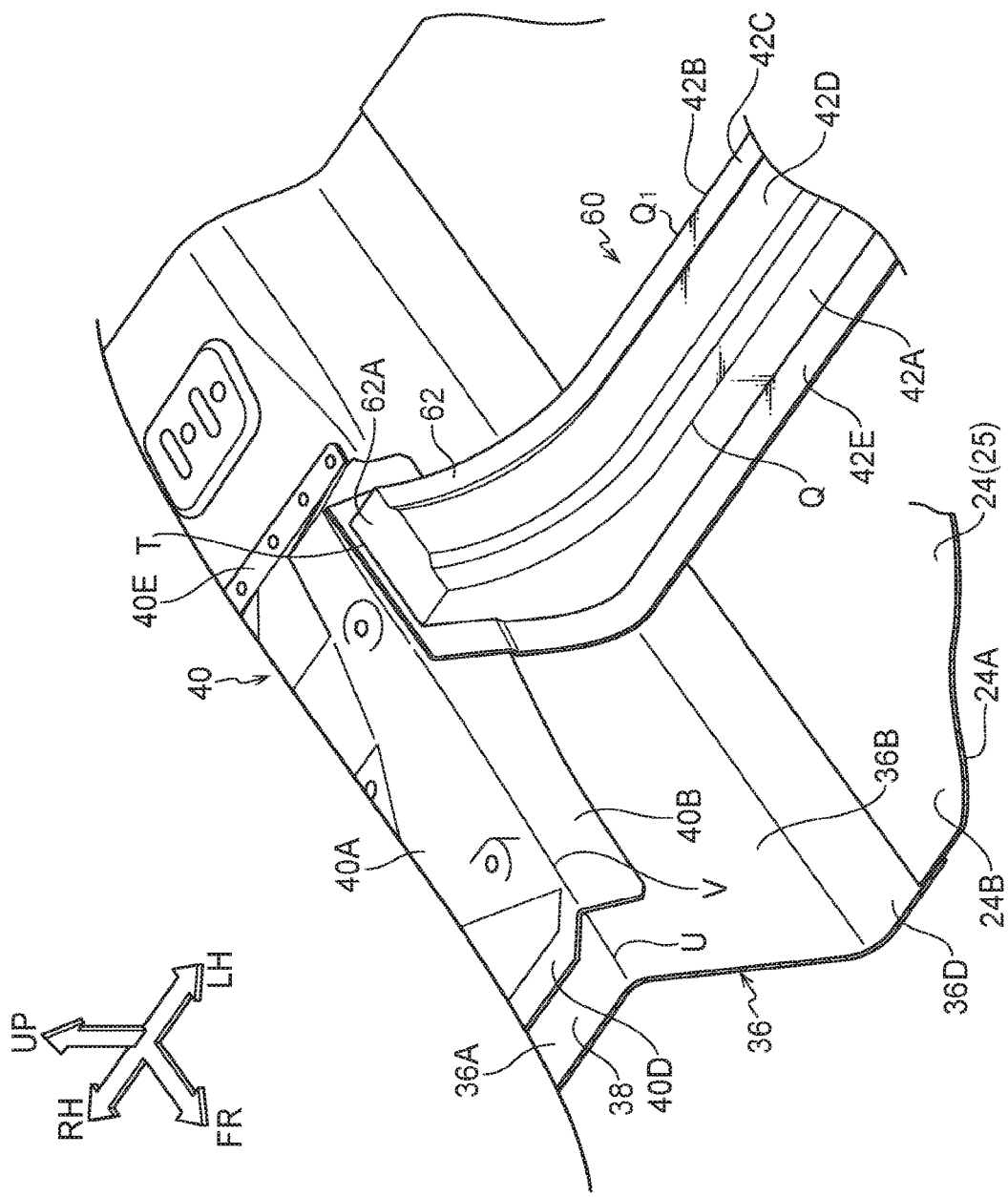
FIG. 6 is a perspective view, corresponding to FIG. 4, showing an example modification of the vehicle skeleton structure pertaining to the embodiment.

For example, as shown in FIG. 6, the vehicle skeleton structure 10 may also be configured such that a cross member 60 is directly joined to the tunnel upper reinforcement 40. Specifically describing those places that differ from the above embodiment, a joint portion 62 that stands erectly upward along the shape of the side wall portion 36B of the tunnel portion 36 is formed on the tunnel upper reinforcement 40 side of the cross member 60.

A distal end surface 62A of the joint portion 62 is formed so as to be substantially parallel to the upper wall portion 36A of the tunnel portion 36. A ridgeline portion T serving as a fourth ridgeline portion positioned on the tunnel upper reinforcement 40 side of the distal end surface 62A and formed along the vehicle front-rear direction is configured so as to occupy the same position in the vehicle vertical direction as a ridgeline portion U serving as a fifth ridgeline portion formed by the upper wall portion 36A and the side wall portion 36B of the tunnel portion 36.

In this way, by forming the cross member 60 such that it is directly joined to the tunnel upper reinforcement 40, it is possible to apply the cross member 60 to the present embodiment without having to increase the number of parts. According to the present embodiment, the cross member 60 can be joined to the tunnel upper reinforcement 40 regardless of whether or not there is a seat bracket.

Embodiments have been described above, but the present disclosure is not limited to these embodiments. The embodiments and the various example modifications may be appropriately combined and used, and the present disclosure can of course be implemented in a variety of ways without departing from the spirit of the present disclosure.

What is claimed is:

1. A vehicle skeleton structure comprising:
   a tunnel portion that is disposed projecting upward in a vehicle vertical direction at a vehicle width direction central portion of a floor panel of a vehicle, and that extends in a vehicle front-rear direction, the tunnel portion including a pair of side wall portions opposing each other in the vehicle width direction, and an upper wall portion that interconnects upper end portions of the pair of side wall portions;
   a tunnel upper reinforcement member that covers the upper wall portion and the pair of side wall portions of the tunnel portion from an exterior of each and that is joined to the tunnel portion, the tunnel upper reinforcement member including a side portion that covers and contacts with one of the pair of side wall portions of the tunnel portion;
   a cross member that bridges, along the vehicle width direction, the tunnel portion and a rocker that is disposed at a vehicle width direction outer side of the floor panel, and that extends in the vehicle front-rear direction, the cross member being directly joined to the side portion of the tunnel upper reinforcement member; and a coupling member which is a seat bracket that couples the cross member and the tunnel upper reinforcement member to each other, wherein the cross member is indirectly joined via the coupling member to the tunnel upper reinforcement member.

2. The vehicle skeleton structure according to claim 1, wherein the coupling member is joined to an end portion of the cross member at a tunnel portion side and to a side wall portion of the tunnel upper reinforcement member, and the coupling member and the cross member form a first closed cross-section portion.

3. The vehicle skeleton structure according to claim 1, wherein the coupling member and the tunnel upper reinforcement member form a second closed cross-section portion.

4. A vehicle skeleton structure comprising:
   a tunnel portion that is disposed projecting upward in a vehicle vertical direction at a vehicle width direction central portion of a floor panel of a vehicle, and that extends in a vehicle front-rear direction, the tunnel portion including a pair of side wall portions opposing each other in the vehicle width direction, and an upper wall portion that interconnects upper end portions of the pair of side wall portions;
   a tunnel upper reinforcement member that covers the upper wall portion and the pair of side wall portions of the tunnel portion from an exterior of each and that is joined to the tunnel portion;
   a cross member that bridges, along the vehicle width direction, the tunnel portion and a rocker that is disposed at a vehicle width direction outer side of the floor panel, and that extends in the vehicle front-rear direction, the cross member being directly or indirectly joined to the tunnel upper reinforcement member; and
   a coupling member that couples the cross member and the tunnel upper reinforcement member to each other, wherein the cross member is indirectly joined via the coupling member to the tunnel upper reinforcement member,
   wherein the coupling member has a quadrangular box shape and includes:
      a front wall portion that is disposed along the vehicle width direction at a vehicle front-rear direction front side of the coupling member,
      a rear wall portion that is disposed along the vehicle width direction at a vehicle front-rear direction rear side of the coupling member and that opposes the front wall portion,
      an upper wall portion that is disposed at a vehicle vertical direction upper portion of the coupling member and that interconnects the front wall portion and the rear wall portion, and
      a side wall portion that is disposed at a rocker side of the coupling member and that interconnects the upper wall portion, the front wall portion, and the rear wall portion, and
   wherein the cross member and the floor panel form a third closed cross-section portion, and the cross member includes:
      a front wall portion that is disposed along the vehicle width direction at a vehicle front-rear direction front side of the cross member,
      a rear wall portion that is disposed along the vehicle width direction at a vehicle front-rear direction rear side of the cross member and that opposes the front wall portion, and
      an upper wall portion that is disposed at a vehicle vertical direction upper portion of the cross member and that interconnects the front wall portion and the rear wall portion, and
   at least a first ridgeline portion, formed by the front wall portion and the side wall portion of the coupling member, and a second ridgeline portion, formed by the front wall portion and the upper wall portion of the cross member, are configured so as to be substantially continuous in the vehicle width direction.

5. The vehicle skeleton structure according to claim 4, wherein a third ridgeline portion formed by the front wall portion and the upper wall portion of the coupling member is configured so as to be substantially continuous in the vehicle width direction with the second ridgeline portion of the cross member.

* * * * *